June 17, 1969 M. LOHR 3,450,235
SELF-LEVELING SHOCK ABSORBER
Filed June 12, 1967 Sheet 1 of 4

INVENTOR
Manfred LOHR
BY
Michael S. Striker
his ATTORNEY

INVENTOR
Monfred LOHR

BY his ATTORNEY

INVENTOR
Manfred LOHR

BY
his ATTORNEY

ABSTRACT OF THE DISCLOSURE

A self-levelling hydropneumatic shock absorber wherein a pin normally prevents flow of fluid between the working and storage chambers. The pin is reciprocable in the piston rod and is biased against a seat by one or more helical expansion or contraction springs. The piston rod can lift the pin off the seat when it moves outwardly whereby the pin establishes a connection between the two chambers and the pressure differential in the two chambers compels the piston rod to move inwardly and to assume a neutral position.

*Cross-reference to related applications*

Shock absorbers which can be modified to embody the present invention are disclosed in the copending applications Ser. Nos. 541,599, now Patent No. 3,380,729, and 618,769 respectively filed by Hoffmann et al. and Hoffmann and assigned to the same assignee.

*Background of the invention*

The present invention relates to a self-levelling hydropneumatic shock absorber or strut which can be utilized in automotive vehicles to regulate the distance between a wheel axle and the chassis.

Certain presently known shock absorbers are provided with a working chamber and a storage chamber each of which contains a gaseous and a liquid fluid. The gaseous fluid acts not unlike a cushion and pressurizes the liquid. In such shock absorbers, a piston is slidable in a main cylinder and carries a piston ring which can prevent or permit flow of liquid between the working chamber and the storage chamber. The parts of the shock absorber must be machined with a high degree of precision and the piston ring is subjected to considerable wear. Moreover, the piston ring must be provided in addition to customary packings for the piston rod so that the piston rod must overcome large frictional forces.

It is an important object of the present invention to provide a shock absorber wherein the flow of fluid between the working chamber and storage chamber is regulated in a novel way and by resorting to a small number of relatively simple parts.

Another object of the invention is to provide a shock absorber wherein the sealing elements are subjected to reduced wear and wherein the piston rod must overcome relatively low frictional resistance when its piston moves in the main cylinder.

*Summary of the invention*

My invention is embodied in a pneumatic or hydropneumatic self-levelling shock absorber which is particularly suited for use between an axle and the chassis of an automotive vehicle. The shock absorber comprises a housing provided with fluid-filled working and storage chambers, a hollow piston rod reciprocably extending into the housing and having an inner end portion provided with a piston which is slidable in a main cylinder installed in the interior of the housing and surrounded by the two chambers, means defining with the cylinder a passage for fluid flow between the two chambers and including a seat defining a portion of such passage, a regulating member reciprocably extending into the hollow piston rod and having a sealing portion movable against the seat to seal the chambers from each other, lifting means provided on the piston rod and engageable with the regulating member for moving the sealing portion away from the seat in response to outward movement of the piston rod beyond a predetermined axial position with reference to the cylinder, and resilient means for biasing the sealing portion against the seat when the lifting means is disengaged from the regulating member.

The resilient means may comprise a conical coil spring or a spring which pulls the sealing portion against the seat. Such spring may be provided outside or in the interior of the piston rod.

The novel features which are considered as characteristic of the invention are set forth in particular in the appended claims. The improved shock absorber itself, however, both as to its construction and its mode of operation, together with additional features and advantages thereof, will be best understood upon perusal of the following detailed description of certain specific embodiments with reference to the accompanying drawing.

*Description of the preferred embodiments*

Figure 1:
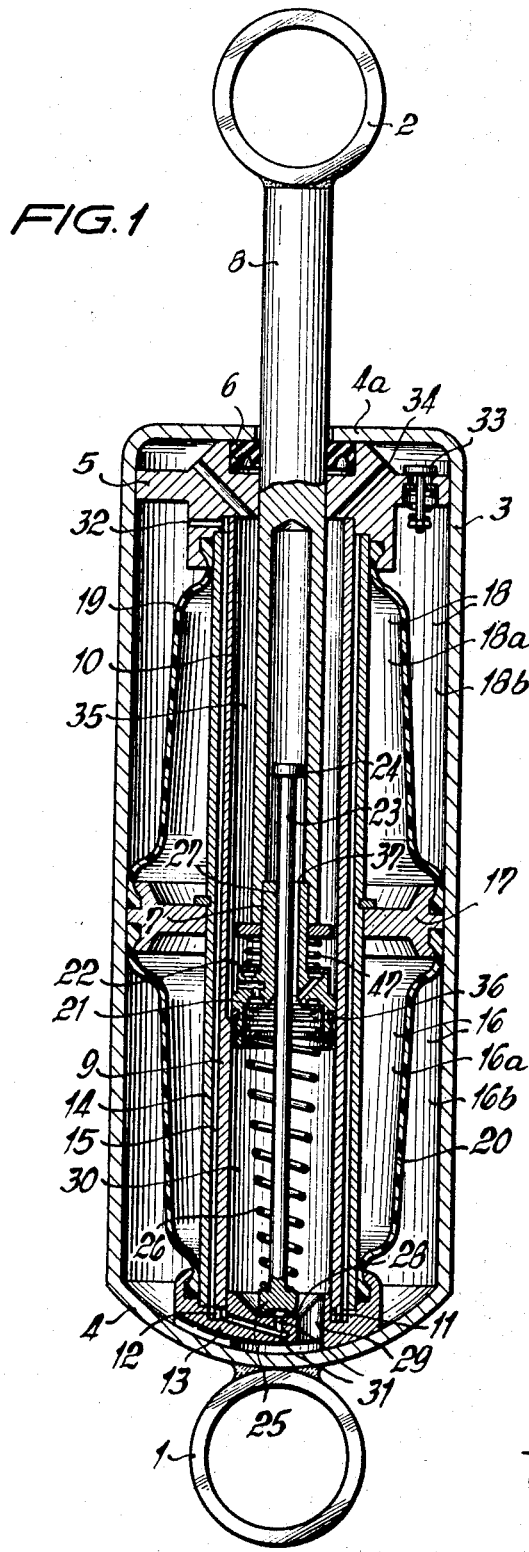
FIG. 1 is an axial section through a self-leveling hydropneumatic shock absorber which embodies one form of my invention and wherein the sealing portion of the regulating member is biased against the seat by a conical coil spring.

FIG. 1 illustrates a hydropneumatic shock absorber having a lower connector in the form of an eye 1 which can be fastened to the axle of an automotive vehicle and an upper connector or eye 2 which can be affixed to the frame or chassis of such vehicle. The shock absorber comprises a housing or shell 3 having a convex bottom wall 4 which is rigid with the lower eye 1. The housing 3 accommodates a partition 5 whic hguides a hollow piston rod 8. The upper eye 2 is affixed to the upper end of the piston rod 8, and the latter extends through the top wall 4a of the housing 3 and through the partition 5. This partition accommodates an annular sealing element 6 for the piston rod 8. The lower end portion of the piston rod is provided with a piston 7 which is slidable in a main cylinder 9, the latter being formed with one or more axially parallel internal grooves 10, with an annular internal groove 11, and a radial duct 12 which communicates with the groove 11. The lower end of the cylinder 9 is mounted in a block-shaped seat 13 affixed to or integral with the bottom wall 4. The cylinder 9 is surrounded by a supporting sleeve 14 and forms therewith an annular channel 15. The upper ends of the cylinder 9 and sleeve 14 are mounted in the partition 5. The partition 5 can be said to form part of the top wall 4a.

The sleeve 14 and the lower part of the housing 3 define between themselves an annular working chamber 16 which accommodates a flexible diaphragm 20 dividing it into a gas-filled compartment 16a or plenum chamber and a liquid-filled compartment 16b. A storage chamber 18 is provided between the upper portions of the housing 3 and sleeve 14; this storage chamber 18 contains a flexible diaphragm 19 which divides it into a gas-filled compartment or plenum chamber 18a and a liquid-filled compartment 18b. The chambers 16, 18 are separated from each other by a centrally located divider 17.

The piston 7 is provided with a check valve or damping valve 21 and with a relief valve 22 which latter opens in response to excessive fluid pressure to prevent destruction of the shock absorber. A central bore 27 of the piston 7 receives a regulating member here shown as a pin 23 whose upper end is provided with a motion receiving enlargement or head 24 and the lower end of which is provided with a substantially cylindrical sealing portion or boss 25. A resilient element in the form of a conical coil spring 26 operates between the boss 25 and the piston 7 to bias the regulating pin 23 downwardly whereby the boss 25 can bear against the seat 13 under the bias of the spring 26 and due to a pressure differential in the spaces 30, 35 at the opposite axial ends of the piston 7. The boss 25 then bears against a surface 28 of the seat 13 to prevent escape of liquid from the working compartment 16b through a channel 29 of the seat 13, lower cylinder space 30, a duct 31 in the surface 28, annular groove 11, duct 12, channel 15 and ducts 32 of the partition 5 into the storage compartment 18b. The latter can communicate with ducts 34 of the partition 5 and with the pumping space 35 in response to opening of a check valve 33.

The parts 5, 9, 13 and 14 define between themselves a composite passage for the flow of liquid between the compartments 16b and 18b. This passage includes the channel 29, space 30, duct 31, groove 11, duct 12, channel 15 and duct 32. A portion of this passage (duct 31) is defined by the seat 13.

In the position shown in FIG. 1, the regulating pin 23 is biased against the surface 28 of the seat 13. When the eye 1 moves toward the eye 2, or vice versa, i.e., when the piston rod 8 penetrates deeper into the cylinder 9, a valve spring 47 closes the relief valve 22 and the pressure of gas which is confined in the storage compartment 18a causes liquid in the storage compartment 18b to open the check valve 33 so that the liquid spills through the ducts 34 of the partition 5 and enters the pumping space 35 of the cylinder 9.

If the distance between the eyes 1 and 2 increases because the chassis moves away from the axle, or vice versa, the check valve 33 in the partition 5 closes and the check valve 21 of the piston 7 opens so that liquid can flow from the pumping chamber 35 into the lower cylinder chamber 30. The chamber 30 is connected with the working compartment 16b through the channel 29. The piston rod 8 lifts the piston 7 and the latter moves its piston ring 36 beyond the lower end of the internal axial groove 10. The gas pressure in the working compartment 16a is then identical with liquid pressure in the spaces 30, 35. The check valve 33 is closed and the liquid prevents further pumping action. This is the normal condition of the shock absorber.

If the vehicle is thereupon unloaded, the piston rod 8 moves upwardly and the motion receiving head 24 of the regulating pin 23 is lifted by a lifting means constituted by an upper end face 37 of the piston 7. The boss 25 moves upwardly and away from the surface 28 of the seat 13. This establishes a connection between the working compartment 16b and the storage compartment 18b because the liquid is free to flow from compartment 16b, through channel 29, lower cylinder chamber 30, duct 31, annular groove 11, duct 12, channel 15 and ducts 32 into the compartment 18b. This reduces the pressure of gas in the working chamber 16 so that the piston rod 8 then moves downwardly until the lifting face 37 of the piston 7 moves away from the head 24 and the boss 25 again abuts against the surface 28 to seal the lower cylinder chamber 30 from the duct 31. Thus, the shock absorber reassumes its normal condition.

An important advantage of the shock absorber shown in FIG. 1 is that the bias of the conical spring 26 in the lower cylinder space 30 increases in automatic response to deeper penetration of the piston rod 8. Also, the regulating pin 23 is automatically disengaged from the surface 28 when the piston rod 8 moves upwardly to permit flow of liquid between the compartments 16b and 18b. It will be seen that the sealing action of the boss 25 becomes stronger when the piston rod 8 moves inwardly, not only because the conical spring 26 stores additional energy but also because the pressure of liquid in the lower cylinder chamber 30 increases. In other words, the sealing action of the boss 25 increases proportionally with increasing difference between the pressures in compartments 16b and 18b. The liquid is deflected during flow through the duct 31 of the seat 13 and thereupon flows through a relatively narrow channel 15; this insures that the time required for a regulation remains within a desired range and that the compartment 16b can communicate with the space 30 through a passage 29 of large cross-sectional area.

Figure 2:
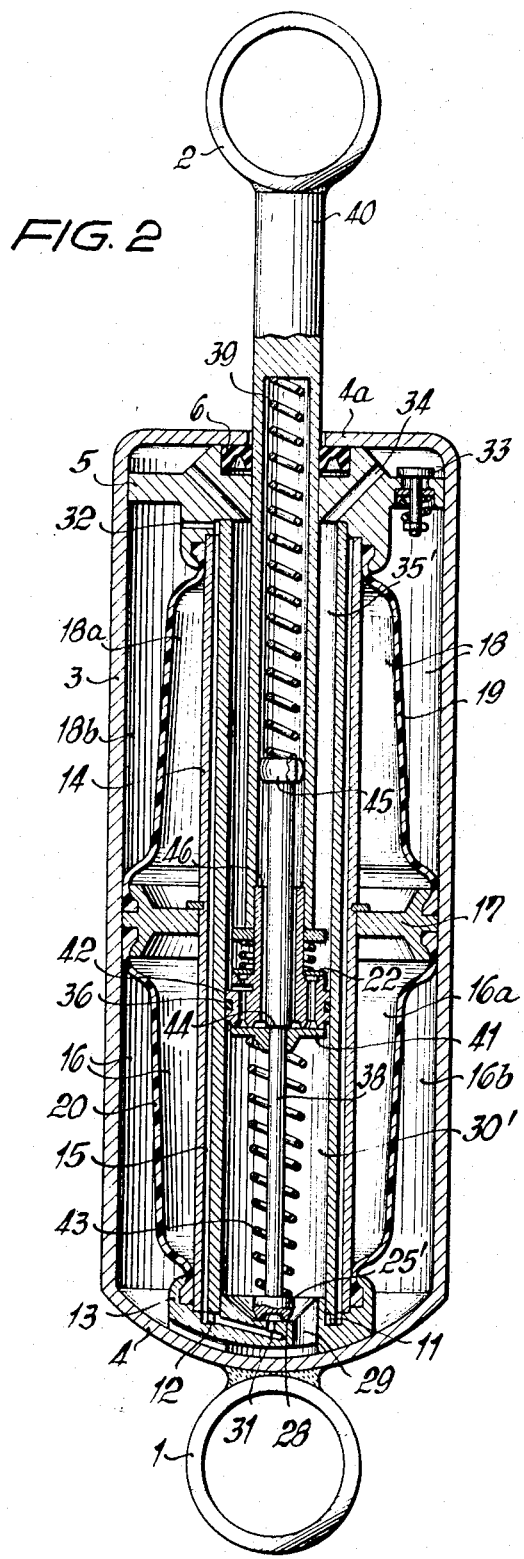
FIG. 2 is a similar axial sectional view of a second self-levelling shock absorber wherein the regulating member can actuate a valve.

FIG. 2 illustrates a second self-levelling shock absorber. This shock absorber comprises a regulating pin 38 having a sealing portion or boss 25' which is biased by a conical coil spring 43 so that it normally bears against the surface 28 of the seat 13. When the piston rod 40 moves inwardly (i.e., downwardly as viewed in FIG. 2), its piston 42 shares such movement and a check valve 41 in the piston 42 closes in response to the bias of the spring 43 and also due to pressure differential in the spaces 30', 35' of the main cylinder 65. The check valve 33 in the partition 5 is open so that the liquid can flow from the storage compartment 18b through the ducts 34 and into the pumping space 35'. When the piston rod 40 moves upwardly, the check valve 33 closes and the check valve 41 opens so that the liquid flows from the pumping space 35' into the lower cylinder space 30'. The latter is in communication with the working compartment 16b through the channel 29 of the seat 13. The piston rod 40 then begins to move downwardly until a motion transmitting shoulder 44 on the regulating pin 38 strikes against and opens the check valve 41 to equalize the pressures of liquid in the space 35' and working compartment 16b. The valve 33 closes and prevents further withdrawal of liquid from the storage compartment 16b.

During unloading of the vehicle, the piston rod 40 moves upwardly until the motion receiving head 45 of the regulating pin 38 engages the lifting face 46 of the piston 42 so that the pin 38 lifts the boss 25' off the surface 28 to establish a connection between the working compartment 16b and the storage compartment 18b. The piston rod 40 then begins to move downwardly until the boss 25' returns into engagement with the surface 28.

The remaining parts of the shock absorber shown in FIG. 2 are identical with those described in connection with FIG. 1 and are denoted by similar reference characters. The spring 39 in the blind bore of the hollow piston rod 40 bears against the head 45 of the regulating pin 38 and can maintain the boss 25' in sealing engagement with the seat 13. This spring is assisted by the differential between the liquid pressures in chambers 30', 35'. The spring 39 also causes the check valve 41 to open when the piston rod 40 moves upwardly.

Figure 3:
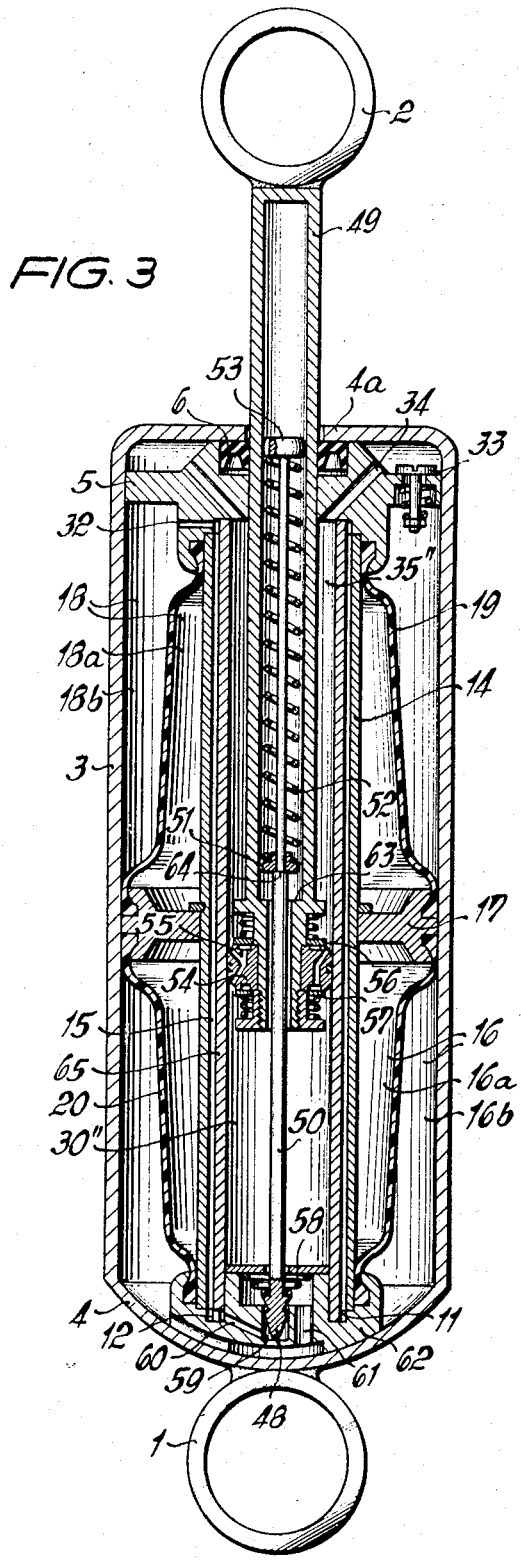
FIG. 3 is an axial sectional view of a third shock absorber wherein the spring which biases the regulating member is accommodated in the hollow piston rod.

FIG. 3 illustrates a third self-levelling hydropneumatic shock absorber. In normal condition of this shock absorber, there exists an equilibrium between the liquid which is drawn from the storage compartment 18b and the liquid which is allowed to pass along the sealing portion as boss 48 of the regulating pin 50. The boss 48 resembles a cone and engages a cylindrical surface of the seat 62; however, it is equally possible to use a cylindrical boss and to provide the seat 62 with a conical surface which tapers in a direction away from the lower cylinder space 30''. The peripheral surface of the boss 48 is provided with one or more annular grooves.

When the piston rod 49 moves downwardly and beyond the normal position, the boss 48 of the regulating pin 50 is biased against the surface at the upper end of a duct 59 in the seat 62 by a conical spring 58. The boss 48 then prevents flow of liquid from the lower cylinder space 30″ through the duct 59, annular groove 11, duct 12, channel 15 and ducts 32 into the storage compartment 18b. If the piston rod 49 moves upwardly, a reciprocable motion receiving member 51 of the regulating pin 50 engages an internal annular lifting face 63 of the piston rod and the member 51 lifts the boss 48 off the surface of the seat 62 through the intermediary of a spring 52 which operates between the member 51 and an enlargement 53 of the regulating pin 50. The spring 52 biases the motion receiving member 51 against a shoulder 64 of the regulating pin 50. This spring 52 is inserted in prestressed condition. The liquid flows into the storage compartment 18b until the pressure in the working chamber 16 balances the load upon the piston rod 49.

The operation of the damping system for the piston rod 49 is independent of the just described operation of the shock absorber shown in FIG. 3. When the piston rod 49 moves downwardly, liquid flows from the lower cylinder space 30″, through a non-sealable throttling bore 55 of the piston 54 and into the pumping space 35″. The flow of liquid through the bore 55 is throttled sufficiently to produce a desirable damping action upon the piston rod 49.

Cavitation in the pumping space 35″ is prevented because this space can receive liquid from the storage compartment 18b through the check valve 33. When the piston rod 49 moves upwardly, its movement is again damped by liquid which flows through the throttling bore 55 but in the opposite direction, i.e., from the pumping space 35″ into the cylinder space 30″. Such liquid increases the pressure in the working chamber 16. Excessive throttling action of liquid flowing through the bore 55 is prevented by two relief valves 56, 57 provided in the piston 54. These valves respectively permit flow of liquid from the space 30″ into the space 35″ and vice versa and open in response to a predetermined maximum pressure in the respective space. The piston 54 is slidable in a main cylinder 65. The numerals 60, 61 respectively denote a duct and a channel in the seat 62. The internal surface at the upper end of the bore in the piston rod 49 limits the upward movement of the enlargement 53 on the regulating pin 50.

The relief valves 22 and 56 in the pistons 7, 42 and 54 open in response to a predetermined pressure in the lower cylinder spaces 30, 30′, 30″ and insure that the pressure in the working chambers 16 continues to rise when the piston rods 8, 40 and 49 move downwardly. Thus, the characteristic curve of the shock absorber remains unchanged. This is in contrast to certain presently known shock absorbers wherein the relief valve is provided between the liquid-filled storage compartment; in such shock absorbers, the pressure in the cylinder remains constant as soon as the relief valve opens so that the characteristic curve flattens out. The curve is a function of the volume of gas in the two plenum chambers.

Figure 4:
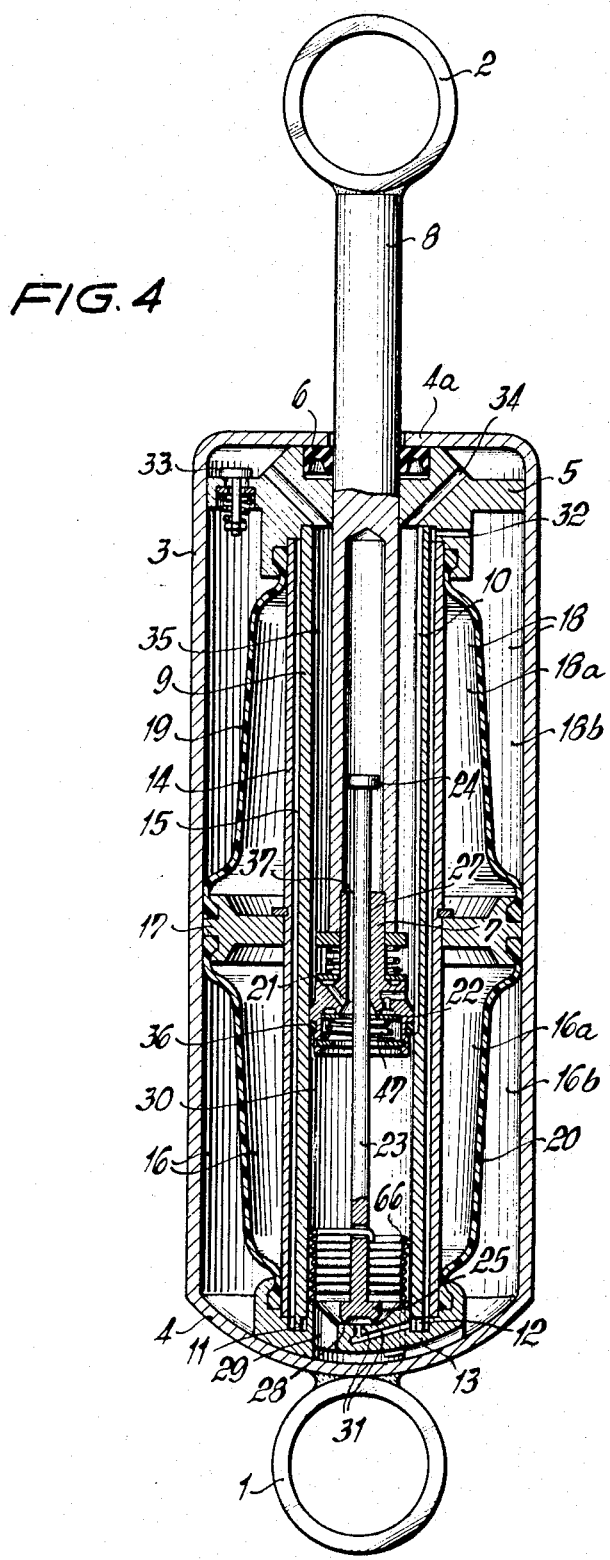
FIG. 4 is an axial sectional view of a fourth shock absorber wherein the regulating member is pulled into sealing engagement with the seat.

Referring finally to FIG. 4, there is shown a hydropneumatic self-levelling shock absorber which is nearly identical with the one shown in FIG. 1. Its parts are denoted by numerals which were described in connection with FIG. 1. In the shock absorber of FIG. 4, the conical coil spring 26 of FIG. 1 is replaced by a coiled tension spring 66 which operates between the regulating pin 23 and the seat 13 and pulls the sealing portion or boss 25 against the surface 28 of the seat.

In the illustrated axial position of the piston rod 8 and regulating pin 23, the spring 66 maintains the boss 25 in sealing engagement with the seat 13. If the piston rod 8 moves downwardly in response to movement of the eye 1 toward the eye 2 or vice versa, the check valve 21 in the piston 7 is closed by the valve spring 47 and the gas filling the compartment 18a expands to force liquid in the compartment 18b to open the check valve 33 in the partition 5 and to flow into the pumping space 35. If the piston rod 8 moves upwardly, the check valve 33 closes and the check valve 21 opens so that the liquid flows from the pumping space 35 into the lower cylinder space 30. The outward or upward movement of the piston rod 8 is terminated when the piston ring 36 moves beyond the lower end of the internal groove 10 in the main cylinder 9. The groove 10 then permits an equalization of pressures in the spaces 30, 35. The pressure in space 30 equals the pressure in working chamber 16 because the compartment 16b is in permanent communication with the space 30 via channel 29. The check valve 33 is closed and prevents further pumping action.

If the vehicle is being unloaded, the piston rod 8 moves upwardly and the motion receiving head 24 of the regulating pin 23 is entrained by the lifting face 37 of the piston 7 so that the boss 25 moves away from the surface 28 of the seat 13 and establishes an uninterrupted passage between the compartments 16b and 18b. The spring 66 stores energy only when the boss 25 moves away from the seat 13. The liquid flows from the compartment 16b via channel 29, duct 31, groove 11, duct 12, channel 15, duct 32 and into the compartment 18b. This reduces the pressure in working chamber 16 so that the piston rod 8 begins to move downwardly and moves the lifting face 37 away from the head 24, i.e., the spring 66 is free to contract and returns the boss 25 into sealing engagement with the seat 13. Thus, the shock absorber reassumes its normal condition.

A very important advantage of the spring 66 is that its bias remains unchanged as long as the face 37 of the piston 7 is disengaged from the head 24 of the regulating pin 23. In the embodiment of FIG. 1, the spring 26 expands and contracts in response to each axial displacement of the piston 7 as long as the boss 25 bears against the seat 13. Thus, the spring 26 of FIG. 1 has a shorter useful life than the spring 66 and its bias changes with age.

It is clear that the spring 66 of FIG. 4 could be installed in such a way that it would operate between the cylinder 9 or another part which is rigid with the housing 3 and the regulating pin 23, as long as it need not share all reciprocatory movements of the piston 7 and piston rod 8. The spring 66 is preferably inserted in prestressed condition. This can be achieved by subjecting it to torsional stresses prior to attachment of its ends to the pin 23 and seat 13. In this way, the spring 66 will provide a desired sealing force in response to small axial displacement of the pin 23.

It will be seen that the spring 66 will be caused to change its bias only during certain stages of operation of the shock absorber, namely, when the piston rod 8 has been moved outwardly to the extent necessary to place the lifting face 37 into engagement with the head 24 of the regulating pin 23. This is in contrast with the spring 26 of FIG. 1 which is compelled to change its bias in normal condition of the shock absorber as well as when the piston rod 8 has penetrated deeper into the main cylinder 9.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims.

I claim:

1. A self-levelling shock absorber, particularly for use between the axle and the chassis of an automotive vehicle, comprising a housing provided with fluid-filled working and storage chambers; a cylinder installed in said housing; a hollow piston rod reciprocably extending into said housing and having an inner end portion provided with a piston reciprocably received in said cylinder, said piston dividing the interior of said cylinder into a pair of spaces one of which communicates with said working chamber and the other of which communicates with said storage chamber; a normally closed check valve in said piston to permit the flow of fluid from said other space into said one space; means defining with said cylinder a passage for fluid flow between said chambers and including a seat defining a portion of said passage; a regulating member reciprocably extending into said hollow piston rod and having a sealing portion movable against said seat to seal said chambers from each other, said regulating member comprising motion transmitting means for opening said check valve in response to movement of said piston in a sense to increase the volume of said one space; lifting means provided on said piston rod and engageable with said regulating member for moving said sealing portion away from said seat in response to outward movement of said piston rod beyond a predetermined axial position with reference to said cylinder; and resilient means for biasing said sealing portion against said seat when said lifting means is disengaged from said regulating member.

2. A shock absorber as defined in claim 1, wherein said passage defining means further include a sleeve surrounding said cylinder and defining therewith an annular channel forming a second portion of said passage.

3. A shock absorber as defined in claim 1, wherein said resilient means for biasing said sealing portion against said seat comprise a coil spring in said hollow piston rod and engaging said regulating member.

4. A shock absorber as defined in claim 1, wherein said regulating member comprises a motion transmitting portion provided in said hollow piston rod and said lifting means comprises a face which is engageable with said motion transmitting portion.

5. A shock absorber as defined in claim 1, wherein said regulating member comprises a portion slidably extending through said check valve and said motion transmitting means comprises a shoulder on said regulating member.

6. A shock absorber as defined in claim 1, further comprising second resilient means for biasing said check valve to closed position.

7. A shock absorber as defined in claim 6, wherein said second resilient means comprises a conical coil spring.

References Cited

UNITED STATES PATENTS

| | | |
|---|---|---|
| 3,110,485 | 11/1963 | Axthammer. |
| 3,222,048 | 12/1965 | Wilkins _____ 267—64 |
| 3,222,049 | 12/1965 | Tuczek _____ 267—64 |
| 3,309,108 | 3/1967 | Wilkins et al. _____ 267—64 |
| 3,353,816 | 11/1967 | Axthammer et al. _____ 267—64 |

GEORGE E. A. HALVOSA, Primary Examiner.

U.S. Cl. X.R.

188—100; 267—64